United States Patent [19]

Kaiya et al.

[11] Patent Number: 4,938,780
[45] Date of Patent: Jul. 3, 1990

[54] PASTE TYPE CADMIUM ANODE AND METHOD FOR MAKING SAME

[75] Inventors: Hideo Kaiya; Katumi Yamashita, both of Fujisawa; Masako Kusaka, Yokohama, all of Japan

[73] Assignee: Matsushita Electric Industrial Co., Ltd., Osaka, Japan

[21] Appl. No.: 407,750

[22] Filed: Sep. 15, 1989

[30] Foreign Application Priority Data

Sep. 27, 1988 [JP] Japan .................................. 63-241317

[51] Int. Cl.⁵ .............................................. H01M 4/26
[52] U.S. Cl. ...................................... 29/623.5; 429/222
[58] Field of Search ............................ 29/623.5, 623.1; 429/222, 213; 204/48, 49; 141/1.1; 423/583

[56] References Cited

U.S. PATENT DOCUMENTS 4,216,045 8/1980 Morioka ............................ 429/222
4,614,696 9/1986 Ito et al. ........................... 429/222
4,826,744 5/1989 Jtou ................................. 429/222 X

FOREIGN PATENT DOCUMENTS 60-63875 4/1985 Japan .
61-61227 12/1986 Japan .

Primary Examiner—Anthony Skapars
Attorney, Agent, or Firm—Stevens, Davis, Miller & Mosher

[57] ABSTRACT

The present invention provides a paste type cadmium anode for alkali storage batteries which comprises an electrically conductive core material, an active material layer mainly composed of cadmium compounds and coated on the core material, an electrically conductive porous layer mainly composed of metallic nickel and provided on the surface of the active material layer, and an organic compound present between the active material layer mainly composed of cadmium compounds and the electrically conductive porous layer mainly composed of metallic nickel. This anode is improved in a cycle life owing to improvement in oxygen gas absorption and prevention of distortion of electrode plate.

A method for making the anode is also provided.

15 Claims, 2 Drawing Sheets

PASTE TYPE CADMIUM ANODE AND METHOD FOR MAKING SAME

BACKGROUND OF THE INVENTION

The present invention relates to a paste type cadmium anode (negative electrode) for alkaline storage batteries and a method for making the same.

More particularly, the present invention aims at improvement of oxygen gas absorbability in paste type cadmium anodes and improvement of the cycle life of electrode plates by inhibiting distortion of the plates caused by dissolution and precipitation of cadmium.

Recently, paste type cadmium anodes comprising an electrically conductive core material to which a pasty active material is coated are widely used because of simple production process, low production costs and attainment of high energy density.

Different from sintered type cadmium anode, since such paste type cadmium anode has no electrically conductive matrix which holds an active material, growth of metallic cadmium produced at charging of battery occurs in the vicinity of the electrically conductive core material and does not easily reach the surface layer of plate. Therefore, reaction between oxygen gas generated from cathode (positive electrode) at overcharging and metallic cadmium does not proceed efficiently and when such anode is used in a sealed storage battery, there is the problem that internal pressure of battery increases in correspondence to insufficient reaction for vanishment of oxygen gas. Further problem is that as a result of repetition of charge and discharge cycle, dissolution and deposition of cadmium are repeated to cause the distortion of an anode and the reduction of a cycle life of anode.

As an approach to solve these problems, Japanese Patent Kokoku (Post-Exam. Publn.) No. 61-61227 has proposed to apply electrolytic nickel plating to the surface of electrode. However, since nickel plating is directly applied to an electrode, nickel on the surface tends to be uneven and thus sufficient effect cannot be obtained.

Moreover, when a nickel layer is provided on the surface of an electrode, the resulting nickel layer reduces overvoltage for generation of hydrogen and so hydrogen is easily generated from an anode at charging. In case of a sealed type storage battery, hydrogen generated is not consumed in the battery and hence is gradually accumulated in the battery if charging conditions are not proper and this hydrogen gas may actuate an explosion-proof safety device generally employed in the battery to break the sealed system of the battery. In such case, the decrease of electrolyte is brought about to cause reduction in the life of battery. Moreover, in case providing a nickel layer on the surface of an electrode, life characteristics can be improved by proper charging, but examination of a battery whose life has expired reveals the presence of coarse cadmium hydroxide crystals in porous nickel layer formed on the surface of the electrode and it is considered that migration of an electrolyte at charging and discharging at the end of life is hindered by the coarse cadmium hydroxide crystal. Therefore, it is considered that if growth of the cadmium hydroxide in the porous nickel can be prevented, the life characteristics of battery can be further improved.

Furthermore, Japanese Patent Kokai (Laid-Open) No. 60-63875 and U.S. Pat. No. 4,614,696 have proposed to provide an electrically conductive layer comprising carbon powder on the surface of an electrode, but it is difficult to provide a uniform conductive layer as provided by plating. Thus, this also has the problem that sufficient effect cannot be obtained.

SUMMARY OF THE INVENTION

It is therefore an object of the present invention to overcome the above-discussed problems and to provide a high performance paste type cadmium anode and a method for making it.

In more detail, the present invention provides an anode which comprises an electrically conductive core material and, coated on the surface thereof, an active material mainly composed of cadmium compounds and, formed on the surface of this active material a dense porous nickel layer mainly composed of metallic nickel and containing a small amount of metallic cadmium, an organic compound layer being provided between the cadmium active material and the nickel layer. Furthermore, a method for making such cadmium anode is provided.

According to the present invention, generation of hydrogen gas resulting from side reactions at the charging of battery is inhibited and besides absorption characteristics of a cadmium anode for oxygen gas generated from a cathode at overcharging which is important when the anode is used in a sealed type nickel cadmium storage battery is greatly improved, and the coarsening of a cadmium active material caused by repetition of charging and discharging in a high temperature atmosphere, distortion of anode caused by dissolution and precipitation reaction of the cadmium active material, reduction in utilization of the active material caused by growth of dendrite and furthermore deterioration of life caused by short circuit can be prevented.

DESCRIPTION OF PREFERRED EMBODIMENTS

The paste type cadmium anode in one example of the present invention will be explained by referring to FIG. 1 which is an enlarged schematic view of the anode.

Figure 1:
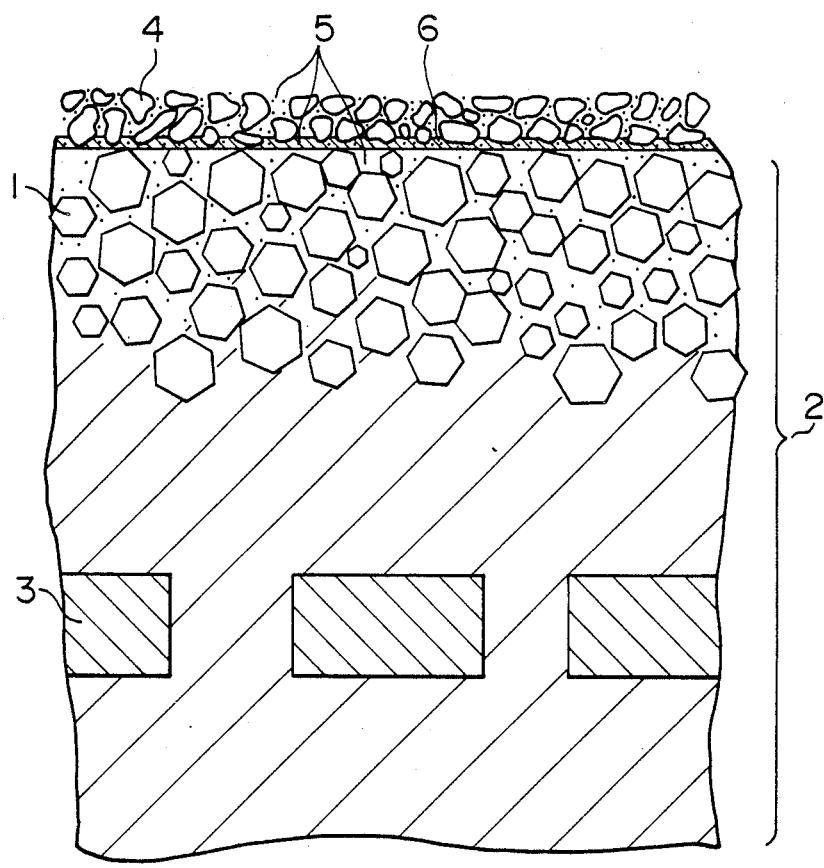
FIG. 1 is a schematic enlarged cross sectional view of the paste type cadmium anode in one example of the present invention.

In FIG. 1, 1 indicates a cadmium active material comprising cadmium compounds such as cadmium hydroxide, cadmium oxide, metallic cadmium, or the like, 2 indicates a layer comprising this active material, 3 indicates an electrically conductive core material which supports the active material 1 and which is a punching metal sheet here which is cross-sectionally shown, 4 indicates a porous nickel layer which is mainly composed of metallic nickel containing a small amount of metallic cadmium and which is formed on the surface of the cadmium active material, and 5 indicates magnesium hydroxide incorporated into active material layer 2, porous nickel layer 4 and organic compound layer 6 formed between active material layer 2 and porous nickel layer 4.

Figure 2:
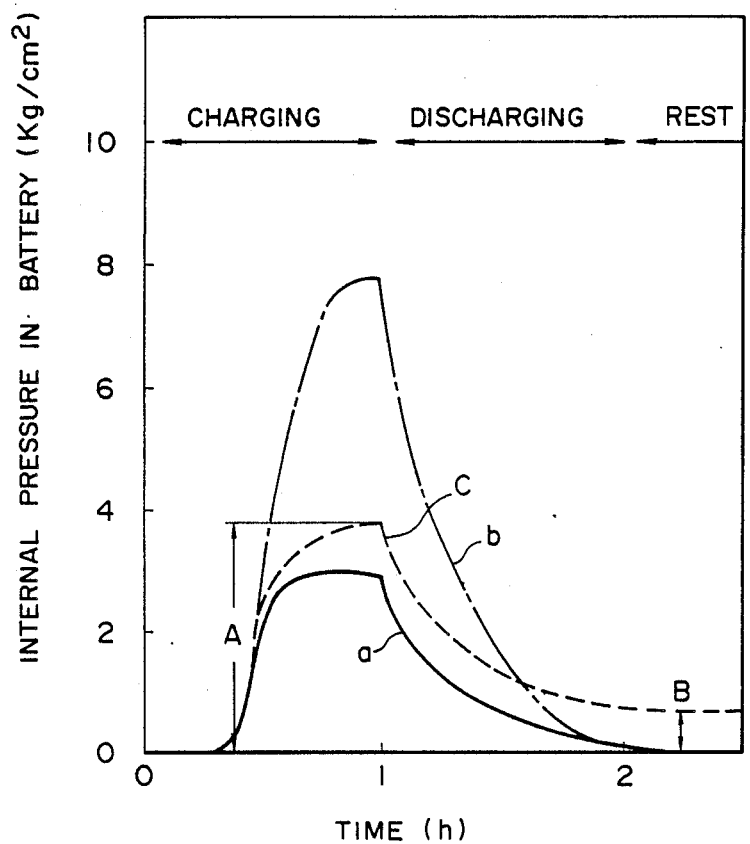
FIG. 2 is a graph which shows the change of an internal pressure of battery at charging and discharging of a sealed type nickel cadmium storage battery.

FIG. 2 shows change of an internal pressure in a sealed type nickel cadmium storage battery at charging and discharging.

In FIG. 2, a shows change of the internal pressure of a battery in which the anode of one example of the present invention was used, b indicates change of the internal pressure of a battery in which a conventional paste type cadmium anode was used, and c indicates change of the internal pressure of a battery as a comparative example. A shows a peak pressure of the internal pressure of the battery at charging and B shows a pressure exerted by hydrogen remaining after rest of discharging.

As mentioned above, the paste type cadmium anode is easier in production than a sintered type anode and has the advantage that a high capacity density can be obtained. On the other hand, in the paste type cadmium anode, there is no electrically conductive matrix as present in the sintered type anode and hence growth of metallic cadmium produced at charging of a battery occurs in the vicinity of the core material and metallic cadmium reaches the surface layer of an electrode plate with difficulty. Therefore, reaction between the metallic cadmium and oxygen gas generated from a cathode at overcharging does not efficiently proceeds and when such anode is used in a sealed type battery, the internal pressure of battery increases.

However, if an electrically conductive porous nickel layer is formed on the surface of plate as in the present invention, production of metallic cadmium proceeds owing to passing of current through the electrically conductive nickel layer on the surface of plate at charging of a battery and as a result metallic cadmium layer is also formed in the surface part of the plate. Moreover, oxygen gas generated from a cathode at overcharging of a battery is absorbed in metallic cadmium of an anode mainly according to the following formula (1).

$$2Cd + O_2 + 2H_2O \rightarrow 2Cd(OH)_2 \tag{1}$$

Therefore, the distribution of metallic cadmium in an anode is very important and the anode of the present invention in which metallic cadmium is distributed much in the surface portion is superior in oxygen gas absorbability.

As conditions for application of the electrically conductive porous nickel layer to the surface of an anode active material, the following points are important.

First of all, it is important that the electrically conductive porous nickel layer is stable in a battery in which the paste type cadmium anode is used. Since batteries which use the cadmium anode generally use an alkaline electrolyte like nickel cadmium storage batteries, the layer is required to be superior in alkali resistance and have a high electrical conductivity. Taking into consideration costs for materials of the layer, nickel is considered most suitable as a material for the electrically conductive layer.

Secondly, the electrically conductive porous nickel layer must have sufficient adhesive properties to the cadmium active material layer and a microporous structure suitable for migration of the electrolyte at charging and recharging.

For example, the application of a nickel powder to the surface of the active material layer by coating or contact bonding is difficult to satisfy the above conditions because this provides insufficient adhesion for passing current and application by electrolytic plating is considered to be most suitable. However, when the porous nickel layer is formed on the active material layer by electrolytic plating, it is necessary to carefully examine the method of plating in order to ensure the uniformity and adhesion of the layer.

For instance, when nickel plating by a usual Watts bath is employed, it sometimes occurs that the nickel plating layer becomes ununiform or adhesion to the active material cannot be ensured due to irregularities of the surface of the plate because of active material particles or due to the presence of cadmium hydroxide which is an insulator.

In case of the paste type cadmium anode of the present invention, an organic compound layer is formed on the surface of the active material of an electrode and hence the surface of the electrode is a smooth and uniform plating layer can easily be formed by electrolytic plating.

The organic compounds, especially those having a substituent are generally known as brightener for improving uniform deposition and smoothness of plating layer and make it possible to form an adhesive porous nickel layer higher in smoothness and adhesion.

The organic compounds used in the present invention should be selected considering film-formability on the surface of plate, stability at nickel plating, industrial productivity in producing the organic compound layer on the plate by coating on or impregnating, and characteristics as plate (solubility in solvents, stability at the subsequent drying and no adverse effect on electrode reaction in operating as a battery).

These organic compounds include ones having at least one selected from the group consisting of aryl group, substituted aryl group and alkylene chain, the substituent containing at least one selected from the group consisting of C=O, C=C, C≡C and OH, preferably fatty acids of 5-30 carbon atoms or salts thereof, or aromatic carboxylic acids in which one of hydrogen atoms bonding to the carbon atoms of fatty acids of up to 18 carbon atoms is substituted with a phenoxy group or phenyl group or salts thereof, taking into account industrial productivities in producing the organic compound layer on an electrode plate by coating or impregnation, as to factors such as the solubility of the organic compounds in a solvent or stability of operation in subsequent drying.

Furthermore, as aforesaid, when porous nickel layer is provided on the surface of electrode, the nickel layer formed causes the reduction of overvoltage for the generation of hydrogen and so hydrogen gas is generated with ease at the time of charging. In the case of a sealed type storage battery, the generated hydrogen gas is not consumed in the battery and hence is gradually accumulated in the battery if charging conditions are not proper. This hydrogen gas actuates an explosion-proof safety device to destroy the sealed system, resulting in deterioration of life of battery.

Therefore, it is necessary to prevent the generation of hydrogen gas resulting from the side reaction at an anode at the time of charging. Prevention of the generation of hydrogen gas can be attained by increasing overvoltage for the generation of gas in the porous nickel layer formed on the surface of plate. Metallic cadmium used as an anode active material is a material high in an overvoltage of generation of hydrogen gas and by adding metallic cadmium also to the porous nickel layer on the surface of plate, it is possible to increase the substantial overvoltage of hydrogen generation of the porous nickel layer.

According to the present invention, deposition of metallic nickel and deposition of metallic cadmium are allowed to occur simultaneously at plating by adding a cadmium salt to a nickel plating bath used for nickel plating on the surface of plate, whereby metallic cadmium is included in the porous nickel layer to prevent the reduction of overvoltage of generation of hydrogen gas.

Furthermore, when charging and discharging cycle life test is conducted using an anode having a porous nickel layer formed on the surface of plate, life characteristics are much improved as compared with conventional anodes having no porous nickel layer on the surface of plate. However, at the end of life, coarsened cadmium hydroxide crystals are recognized in the porous nickel layer on the surface of plate. It is considered that growth of cadmium out of the plate as dendrite can be prevented by the porous nickel layer, but the coarsened cadmium hydroxide present in the nickel layer inhibits the migration of an alkaline electrolyte which contributes to electrode reactions and thus deteriorates charge and discharge characteristics of electrode.

Magnesium compounds are known to have the effect to prevent coarsening of cadmium crystal as shown in Japanese Patent Kokoku (Post Exam. Publn.) No. 62-15994.

According to the present invention, the magnesium compound is fixed in the cadmium active material and porous nickel layer by impregnating the cadmium compounds and porous nickel layer with a magnesium salt solution, after the formation of the porous nickel layer on the surface of plate, followed by treating with an alkali solution to convert the magnesium salt to magnesium hydroxide.

Thus, coarsening of the cadmium compounds in the cadmium active material layer and porous nickel layer can be prevented, whereby the above-mentioned problems caused by coarsening of cadmium hydroxide in the porous nickel layer can be solved and further improvement in life can be attained.

The present invention will be explained in detail by the following examples.

EXAMPLE 1

A solution of polyvinyl alcohol in ethylene glycol was added to a cadmium oxide powder having an average particle size of about 1μ, followed by kneading to obtain a paste. This paste was coated on a nickel-plated perforated steel sheet of 0.1 mm thick which was an electrically conductive support and dried at about 140° C. for 30 minutes to obtain an electrode of about 0.5 mm thick. Then, this electrode was immersed in a mixed solution of water and ethylene glycol which contained 0.5% by weight of phenoxyacetic acid having a structural formula:

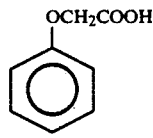

for about 10 seconds to impregnate the electrode with the solution and then was dried at 80° C. to form a phenoxyacetic acid layer on the surface of the electrode. Further, this electrode was subjected to electrolytic plating in a plating bath containing 0.1 mol/l of nickel sulfate, $10^{-3}$ mol/l of cadmium sulfate and 0.5 mol/l of boric acid at a current density of 10 A/dm² at 20° C. for 30 seconds to form a nickel plating layer on the surface.

This electrode which was washed with water and dried after the nickel plating was immersed in an aqueous solution containing 0.5 mol/l of magnesium sulfate and then taken out therefrom and dried.

Then, this electrode was subjected to charging formation to about 40% of theoretical capacity in an aqueous NaOH solution which was an alkaline solution, was washed with water and dried to obtain a paste type cadmium anode. This anode was referred to as (a).

On the organic compound phenoxyacetic acid layer shown by 6 in FIG. 1, there was provided a porous nickel layer 4 mainly composed of nickel and formed by the electrolytic plating. Since the plating bath contained cadmium ion, metallic cadmium was deposited on the surface of the electrode simultaneously with deposition of metallic nickel at the time of electrolysis. Therefore, the material which formed porous electrically conductive layer 4 was metallic nickel containing a small amount of metallic cadmium.

The magnesium sulfate impregnated in electrode after nickel plating reacted with an alkaline solution at the formation conducted in the alkaline solution to be converted to magnesium hydroxide 5, which was present in the active material layer, the organic compound phenoxyacetic acid layer and the porous nickel layer.

Distribution state of the respective constructive elements shown in FIG. 1 can be confirmed by the following method.

That is, the porous nickel layer is confirmed by observation of SEM photograph of cross-section of the electrode and distribution of metallic cadmium and magnesium hydroxide and organic compound in the porous nickel layer is confirmed by electron probe X-ray micro analysis of distributions of Cd, Mg, C, H, etc.

A sealed type nickel cadmium storage battery of 1.2 Ah was fabricated using anode (a) obtained in this example, a conventional sintered type nickel cathode, a separator comprising a polyamide nonwoven fabric, and an aqueous potassium hydroxide solution as an electrolyte and battery characteristics were evaluated.

That is, evaluation of internal pressure in the battery at overcharging for evaluation of oxygen gas absorption characteristic of anode and evaluation of deterioration of life due to distortion of anode caused by repetition of charging and discharging, reduction of utilization of anode caused by growth of dendrite formed by dissolution and precipitation of active material and short-circuit were conducted.

The internal pressure of a battery at overcharging was evaluated by an internal pressure when overcharging was carried out at a current of 2 C (C represents the capacity of a battery) in an atmosphere of 20° C. and the cycle life was evaluated by reduction of capacity after repetition of the cycle of charging with a current of ⅓ C at 50° C. for 4.5 hours and complete discharging with a loading of resistance corresponding to a current of 1 C.

FIG. 2 shows change of internal pressure of battery at charging and discharging. The internal pressure begins to rise from the point when the battery enters the area of overcharging, then reaches a peak pressure and decreases at discharging. Oxygen gas absorption of a anode can be evaluated by the internal pressure of battery. That is, the anode of high oxygen gas absorption gives a low internal pressure and that of low oxygen gas absorption gives a high internal pressure.

The curve a in FIG. 2 shows internal pressure characteristics of battery using the anode of this example and curve b shows internal pressure characteristics of battery using a conventional paste type anode. Furthermore, curve c shows those of a battery of comparative example. Oxygen generated at overcharging is usually completely absorbed in anode at discharging and suspension period and so the pressure in the battery returns to the initial state of charging, but in case hydrogen is generated from anode as a result of side reactions at charging, this hydrogen is not consumed in the battery and hence the internal pressure remains as residual pressure B as in the comparative example shown by curve c in FIG. 2.

The oxygen absorption of anode was evaluated in terms of A-B and the generation of hydrogen was evaluated in terms of the residual pressure B.

The charge and discharge cycle life was eva uated in terms of the number of cycles (the number of life cycles) when capacity was deteriorated to 80% of the initial capacity upon repetition of charging and discharging according to the method mentioned above.

COMPARATIVE EXAMPLE 1

An anode was prepared in the same manner as in Example 1 except that charging formation was carried out without electrolytic plating and other treatments and a battery was prepared using the anode in the same manner as in Example 1. Evaluation of the battery was conducted as in Example 1 and the results are shown in Table 1 together with those of Example 1.

TABLE 1

|  | Internal pressure of battery A-B ($kg/cm^2$) | Hydrogen gas pressure B ($kg/cm^2$) | The number of life cycle (time) |
|---|---|---|---|
| Example 1 | 3.0 | 0 | 2000 |
| Comparative Example 1 | 7.8 | 0 | 450 |

It can be seen that according to the present invention, the oxygen gas absorption of anode was greatly improved and besides the cycle life was also sharply improved.

EXAMPLES 2-10

Example 1 was repeated except that the organic compounds shown below were used in place of phenoxyacetic acid.

As stated before, the purpose of adding the organic compounds is to smoothen the surface of coated electrode plate and to form a dense and highly adhesive plating layer like ordinary brigtners do. These organic compounds include ones having at least one selected from the group consisting of aryl group, substituted aryl group and alkylene chain, the substituent containing at least one selected from the group consisting of C=O, C=C, C≡C and OH, preferably fatty acids of 5-30 carbon atoms or salts thereof, or aromatic carboxylic acids in which one of hydrogen atoms bonding to the carbon atoms of a fatty acid of up to 18 carbon atoms is substituted with a phenyl group or salts thereof, taking into account industrial productivities in producing the organic compound layer on an electrode plate by coating or impregnation, as to factors such as the solubility of the organic compounds in a solvent or stability of operation in subsequent drying.

(2) Atropic acid
$CH_2=C-COOH$
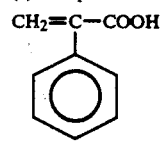

(3) Phenylpropiolic acid
$C\equiv CCOOH$
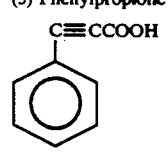

(4) Methyl p-hydroxybenzoate
OH
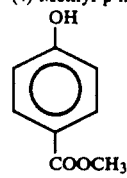
$COOCH_3$ (5) Vinylbenzoic acid
COOH
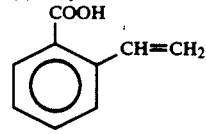
$CH=CH_2$ (6) sec-butylmalonic acid
$CH_3$
|
$CH_3CH_2CHCH(COOH)_2$ (7) Glycol stearate
$$CH_2CH_2-O-\overset{O}{\underset{\|}{C}}(CH_2)_{16}CH_3$$
|
OH (8) Stearic acid
$C_{17}H_{35}COOH$ (9) γ-Phenylcrotonic acid
$CH_2CH=CHCOOH$
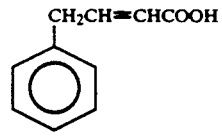

(10) Phenylacetic acid
$CH_2COOH$
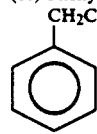

The resulting anodes were evaluated as in Example 1 to obtain nearly the same results as in Example 1 for internal pressure characteristics and life characteristics.

EXAMPLE 11

Six anodes eere prepared in the same manner as in Example 1 with changing concentration of cadmium salt in plating bath in order to obtain proper value of concentration of cadmium salt contained in the nickel plating bath and characteristics of batteries having these anodes were evaluated. The results are shown in Table 2

TABLE 2

| Concentration of cadmium salt (mol/l) | Internal pressure of battery A-B (kg/cm$^2$) | Hydrogen gas pressure B (kg/cm$^2$) | Number of life cycle (time) |
| --- | --- | --- | --- |
| 0 | 3.8 | 0.7 | 2000 |
| $10^{-5}$ | 3.7 | 0.7 | 2000 |
| $10^{-4}$ | 3.0 | 0 | 2000 |
| $10^{-3}$ | 3.0 | 0 | 2000 |
| $10^{-2}$ | 3.2 | 0 | 2000 |
| $10^{-1}$ | 6.0 | 0 | 1200 |

The sample of 0 mol/l in concentration of cadmium salt corresponds to the battery of comparative example shown by curve c and since metallic cadmium was not present in porous nickel layer formed on the surface of plate, overvoltage for formation of hydrogen was low and hydrogen was generated at charging as a result of side reactions. Therefore, hydrogen remained in the battery after discharging and suspension of operation and internal pressure of battery did not return to the initial state. Concentration of cadmium salt in plating bath which can provide the effect to prevent generation of hydrogen at charging was $10^{-4}$ mol/l or higher, but if the concentration is too high, rather the efficiency of precipitation of nickel decreases resulting in deterioration of oxygen gas absorption and life. Therefore, preferred range of the concentration is $10^{-4}$–$10^{-2}$ mol/l.

EXAMPLE 12

Anodes were prepared in the same manner as in Example 1 with changing electric current conditions for plating in order to obtain proper conditions for electrolytic plating and characteristics of battery were evaluated.

The concentration of an aqueous solution of nickel salt used for electrolytic plating is usually about 1 mol/l in case of carrying out nickel plating, but in the present invention, it is necessary to carry out the plating at the nickel salt concentration in the range of 0.05–0.2 mol/l. When nickel plating is conducted on the surface of porous electrode, if concentration of aqueous nickel salt solution is high, diffusion and supply of nickel smoothly proceed and plating preferentially occurs in the pores than on the surface of electrode and plating is not sufficiently formed on the surface layer. The upper limit of the nickel concentration of a plating bath which can yield porous nickel plating layer on the surface of porous electrode is about 0.2 mol/l. On the contrary, if the nickel concentration is too low, generation of hydrogen gas is brought about to cause reduction in efficiency of deposition of nickel. The lower limit of the nickel concentration is about 0.05 mol/l. Therefore, proper range of nickel concentration in plating bath is 0.05–0.2 mol/l. There is a similar relation between the apparent area of electrode and the current density for plating and in the case of the above nickel concentration, if the current density is lower than 5 A/dm$^2$, nickel is also deposited inside the cadmium active material and deposition of nickel on the surface of electrode is reduced. Therefore, the lower limit of current density is suitably about 5 A/dm$^2$. If the current density is too high, the generation of hydrogen gas is brought about to cause reduction in efficiency of deposition of nickel. Thus, the upper limit of current density is preferably about 20 A/dm$^2$.

With reference to an electrical quantity for plating, the following can be said.

When the electrical quantity is small, the formation of metallic nickel layer of sufficient porosity cannot be ensured and lower limit is about 30 mAh/dm$^2$.

On the other hand, if the electrical quantity is too much, there are the problems that the plating layer becomes too thick and ionic conductivity in the porous nickel layer decreases and a battery fabricated using this anode is inferior in discharge characteristics. Therefore, the upper limit of electrical quantity is about 500 mAh/dm$^2$.

When electrode prepared by using an electrical quantity of 30 mAh/dm$^2$ at nickel plating and electrode prepared by using an electrical quantity of 500 mAh/dm$^2$ at nickel plating were cut and SEM photographs of the cross-sections were examined to find that thicknesses of nickel plating layers formed at an electrical quantity of 30 mAh/dm$^2$ and 500 mAh/dm$^2$ are about 0.6$\mu$ and about 5$\mu$, respectively.

Furthermore, the nickel plating layer was peeled off and nickel was dissolved with nitric acid and amount of nickel was determined. A porosity of nickel layer was calculated from the thus obtained amount of nickel and thickness of nickel layer to obtain about 70% and about 40% of electrodes of 30 mAh/dm$^2$ and 500 mAh/dm$^2$ in electrical quantity, respectively. Accordingly, it is considered that the thickness of the nickel plating layer of about 0.6–5$\mu$ and a porosity of about 40–70% are preferred as conditions for the nickel plating layer under which the effect of the present invention can be sufficiently obtained. Such nickel plating layer can be ensured by maintaining suitable plating electrical conditions.

Therefore, a nickel concentration in plating bath of 0.05–0.2 mol/l, a current density for plating of 5–20 A/dm$^2$ and an electric quantity for plating of 30–500 mAh/dm$^2$ are suitable and nearly the same battery characteristics as those of Example 1 were obtained for batteries in which was used an anode prepared by employing the above conditions for plating.

EXAMPLE 13

Examination was conducted on amount of magnesium hydroxide to be impregnated in electrode plate.

The amount of magnesium hydroxide in the anode of Example 1 was 0.8% by weight based on the amount of cadmium active material. The proper range of the amount thereof was obtained by changing the concentration of magnesium sulfate impregnated in electrode plate, namely, anodes were prepared in the same manner as in Example 1 with changing the concentration of magnesium sulfate. As a result, regarding the amount of magnesium hydroxide, effect on life began to be conspicuous at about 0.1% by weight based on cadmium active material and when it was more than 3% by weight, magnesium hydroxide present in the porous nickel layer on the surface of electrode plate inhibits migration of electrolyte to cause deterioration of discharging characteristics of battery. Thus, proper range thereof is 0.1–3% by weight based on cadmium active material. Nearly the same results as in Example 1 were obtained for batteries in which was used an anode prepared under this condition.

EXAMPLE 14

In case of paste type cadmium anode, usually cadmium oxide or hydroxide as an active material is coated on an electrically conductive core material and dried and thereafter this coated electrode plate is subjected to formation comprising converting a part of cadmium oxide or cadmium hydroxide into metallic cadmium by negative electrolysis in an alkali solution as in Example 1 in order to give metallic cadmium as preliminary charging quantity.

However, recently, in order to omit the step of formation, a method is employed to use a mixture of cadmium oxide or cadmium hydroxide with metallic cadmium. The following examination was made on the basis of such method.

In place of cadmium oxide used in Example 1, metallic cadmium powder corresponding to metallic cadmium produced at formation was previously incorporated into active material paste and an anode as impregnated with a magnesium sulfate solution was prepared in the same manner as in Example 1 and a battery was made using this anode in the same manner as in Example 1. This battery was evaluated on the battery characteristics as in Example 1. In this case, magnesium sulfate impregnated in electrode plate was converted into magnesium hydroxide by electrolyte in the battery and the nearly the same battery characteristics as in Example 1 were obtained.

In case of using this method, as anions of magnesium salt, those which have no adverse effect on battery characteristics such as sulfate ion must be selected and those which have adverse effect on battery characteristics such as nitrate ion must be avoided.

As explained above, the paste type cadmium anode of the present invention is improved in cycle life owing to improvement of oxygen gas absorption, inhibition of dissolution and precipitation of cadmium and prevention of distortion of plate.

What is claimed is:

1. A method for making a paste type cadmium anode which comprises coating a core material with an active material mainly composed of cadmium compounds, then impregnating or coating this active material coated core material with an organic compound, and then forming a porous metallic nickel layer on the surface of this organic compound-applied electrode plate by electrolytic plating.

2. A method for making a paste type cadmium anode according to claim 1, wherein the organic compound has at least one selected from the group consisting of aryl group, substituted aryl group and alkylene chain, the substituent containing at least one selected from the group consisting of C=O, C=C, C≡C and OH.

3. A method for making a paste type cadmium anode according to claim 1, wherein the organic compound is a fatty acid of 5-30 carbon atoms, or a salt thereof.

4. A method for making a paste type cadmium anode according to claim 1, wherein the organic compound is an aromatic carboxylic acid in which one of hydrogen atoms bonding to carbon atoms of a fatty acid of up to 18 carbon atoms is substituted with a phenyl group, or a salt thereof.

5. A method for making a paste type cadmium anode according to claim 1, wherein the organic compound is an aromatic carboxylic acid in which one of hydrogen atoms bonding to carbon atoms of a fatty acid of up to 18 carbon atoms is substituted with a phenoxy group.

6. A method for making a paste type cadmium anode according to claim 1, wherein an electrolytic plating bath for forming the porous metallic nickel layer contains 0.05-0.2 mol/l of nickel and $10^{-4}$-$10^{-2}$ mol/l of cadmium.

7. A method for making a paste type cadmium anode according to claim 1, wherein a current density for the electrolytic plating is 5-20 $A/dm^2$ based on the apparent area of electrode plate.

8. A method for making a paste type cadmium anode according to claim 1, wherein an electric quantity for the electrolytic plating is 30-500 $mAh/dm^2$ based on the apparent area of electrode plate.

9. A method for making a paste type cadmium anode which comprises the steps of coating an active material mainly composed of cadmium compounds on an electrically conductive core material; impregnating or coating this active material-coated core material with an organic compound; forming a porous metallic nickel layer on the surface part of this organic compound-applied electrode plate by electrolytic plating; and impregnating the electrode plate having the porous metallic nickel layer with a magnesium salt solution and converting the magnesium salt into magnesium hydroxide through a reaction with an alkali solution to allow the magnesium hydroxide to be contained in the electrode.

10. A method for making a paste type cadmium anode according to claim 9, wherein the reaction of the magnesium salt and the alkali solution is carried out simultaneously with formation which comprises subjecting the resulting electrode to negative electrolysis in an alkali solution to produce metallic cadmium in the electrode.

11. A method for making a paste type cadmium anode according to claim 9, wherein the reaction of the magnesium salt and the alkali solution is carried out in an alkali solution which is an electrolyte of the battery.

12. A method for making a paste type cadmium anode according to claim 9, wherein the organic compound has at least one selected from the group consisting of aryl group, substituted aryl group and alkylene chain, the substituent containing at least one selected from the group consisting of C=O, C=C, C≡C and OH.

13. A method for making a paste type cadmium anode according to claim 9, wherein the organic compound is a fatty acid of 5-30 carbon atoms or a salt thereof.

14. A method for making a paste type cadmium anode according to claim 9, wherein the organic compound is an aromatic carboxylic acid in which one of hydrogen atoms bonding to carbon atoms of a fatty acid of up to 18 carbon atoms is substituted with a phenyl group, or a salt thereof.

15. A method for making a paste type cadmium anode according to claim 9, wherein the organic compound is an aromatic carboxy acid in which one of hydrogen atoms bonding to carbon atoms of a fatty acid of up to 18 carbon atoms is substituted with a phenoxy group, or a salt thereof.

* * * * *